United States Patent [19]

Murib et al.

[11] Patent Number: 5,140,051
[45] Date of Patent: Aug. 18, 1992

[54] FOAMING AGENT WITH ALCOHOL ACTIVATOR AND METHOD FOR PRODUCING NON-CHALKING POLYMERS

[75] Inventors: Jawad H. Murib; Pradeep D. Damle, both of Cincinnati, Ohio

[73] Assignee: Quantum Chemical Corporation, New York, N.Y.

[21] Appl. No.: 861,681

[22] Filed: Apr. 1, 1992

Related U.S. Application Data

[62] Division of Ser. No. 796,482, Nov. 22, 1991.

[51] Int. Cl.⁵ .............................................. C08J 9/06
[52] U.S. Cl. .................................... 521/84.1; 264/54; 264/DIG. 83; 521/85; 521/88; 521/143; 521/144; 521/146; 521/147; 521/180
[58] Field of Search ............... 521/84.1, 85, 88, 143, 521/144, 146, 147, 180; 264/54, DIG. 83

[56] References Cited

U.S. PATENT DOCUMENTS

| | | | |
|---|---|---|---|
| 3,331,790 | 7/1967 | Scheurlen et al. | 521/85 |
| 4,394,458 | 7/1983 | Wade | 521/103 |
| 4,397,948 | 8/1983 | Wade | 521/139 |

*Primary Examiner*—Morton Foelak
*Attorney, Agent, or Firm*—Kenneth D. Tremain; William A. Heidrich

[57] ABSTRACT

A method of making a foamed polymer article by injection molding, using a foaming agent that evolves minimal water and does not form byproducts which could pit or chalk the polymer surface. The foaming agent contains sodium borohydride in an amount from 0.01 weight percent of the polymer to be foamed, and a polyhydric alcohol such as six-carbon mannitol as an activator to react with the sodium borohydride and produce hydrogen gas. Boric acid can be included with the alcohol. The sodium borohydride is kept separated from the other reactive components such as by encapsulation until gas production is desired when the polymer is heated and molded.

9 Claims, No Drawings

FOAMING AGENT WITH ALCOHOL ACTIVATOR AND METHOD FOR PRODUCING NON-CHALKING POLYMERS

CROSS-REFERENCE TO RELATION APPLICATION

This is a divisional of application Ser. No. 07/796,482, filed Nov. 22, 1991.

BACKGROUND OF THE INVENTION

1. Field of the Invention

This invention relates generally to foamed polymer products. More particularly, the invention concerns a chemical foaming agent and a method of using such agent to make molded foamed polymer articles.

2. Description of Related Art

Foaming agents, also known as blowing agents, are used during processing of polymers to achieve a cellular structure in the final product. As described in the article "Foaming Agents" in *Modern Plastics Encyclopedia* (Mid-October 1989 Issue Volume 66, Number 11), chemical blowing agents (CBAs) are substances that decompose at elevated temperatures or through chemical reaction and form gaseous composition products. Reasons given for the use of foaming agents include weight reduction for savings in cost and material, better properties such as insulation against heat or noise, different surface appearances, improved stiffness, and different electrical properties.

One widely used inorganic chemical blowing agent is sodium borohydride ("SBH"). As explained in U.S. Pat. No. 4,769,397 to Lapierre et al., SBH reacts with water or some other proton donor or "activator" to release gas for foaming. That patent describes an activation system comprising a mixture of sodium bicarbonate and citric acid which reacted to evolve water and carbon dioxide.

In some applications the use of a sodium bicarbonate/citric acid activation system has been associated with a phenomenon known as "chalking," in which a white material believed to be borax and sodium carbonate forms on the surface of a molded part. One object of this invention is to provide an improved activator for SBH to avoid chalking problems.

Commercially available foaming agents are typically in the form of concentrates: active ingredients encapsulated in a carrier resin. Another object of this invention is to provide an improved foaming agent concentrate which is stable during storage.

SUMMARY OF THE INVENTION

The invention concerns a foamable polymeric composition comprising a polymer to be foamed and a foaming agent. The agent contains an alkali metal borohydride such as sodium borohydride in an amount from 0.01 to 5.0 weight percent of the polymer, and an amount of a polyhydric alcohol sufficient to react with the sodium borohydride. The sodium borohydride and the alcohol are separated from direct contact with each other until gas production is desired. Boric acid can be included with the alcohol.

DETAILED DESCRIPTION OF THE INVENTION

Novel foaming agents and methods for making foamed injection molded articles using such agents are described below. In the method of the invention, a foaming agent comprising SBH, an activator for the SBH, and a polymer to be foamed are all fed to an injection molding machine. The polymer melts as it moves through the machine's barrel and is mixed with the SBH and activator. The SBH and activator react in this mixture and evolve gas, resulting in a foamed polymer article.

Sodium Borohydride

Sodium borohydride ("SBH") is available from Morton International of Danvers, Mass. To protect the SBH from contact with moisture or from other conditions which would cause a premature reaction, the SBH is preferably encapsulated in a carrier resin. Encapsulated SHB is available from Quantum Chemical Corporation, USI Division, as product code FM1776H which is 10% by weight SBH in a polystyrene carrier.

Borohydrides of other alkali metals such as lithium, potassium, rubidium, and cesium should be considered equivalents and can be used in this invention, although sodium borohydride is preferred.

Activator

Although SBH can react with many possible proton donor activators to evolve hydrogen gas, the choice of a suitable activator for use in foamed polymer products is more limited.

Not only must the activator function at the intended polymer processing conditions, but it should have no undesirable characteristics such as handling attributes, effects on processing equipment, or appearance in the final foamed product. An activator ideally should be non-volatile under the reaction conditions encountered during mixing and molding and should not form corrosive byproducts in reaction with the sodium borohydride. Both the activator and its reaction products with SBH should be dispersible in the polymer to be foamed.

Certain polyhydric alcohols have been found to be effective activators for SBH with minimal undesired effects. Four to six carbon polyhydric alcohols occur in nature or can be made by hydrogenation of the corresponding sugars. Examples are erythritol, pentaerythritol, arabitol, xylitol, adonitol, mannitol, dulcitol, and sorbitol, of which erythritol, mannitol, dulcitol, and sorbitol are preferred.

Especially preferred is mannitol, which is derived from corn syrup or glucose and has six hydroxyl groups. Mannitol by itself can provide the necessary proton donor for reaction with the SBH. The activator can include boric acid which will react with the polyhydric alcohol. When boric acid is included, it is believed that the boric acid reacts with the mannitol to form a mannitol-borate complex and water. Both the complex and the water can react with the sodium borohydride and produce hydrogen gas and a sodium mannitol borate complex. This high molecular weight complex is dispersible within the foamed polymer and will not exude to the polymer surface.

Mannitol without boric acid is nevertheless preferred, in part because the water which forms has undesirable effects on the polymer processing equipment and in the molded article. A single component activator system also has advantages over dual-component systems in which a small percentage of the activator components may contact each other during encapsulation and can evolve water.

Foaming Agent

The foaming agent comprises SBH and the activator. The amount of the agent used to foam a polymer will depend upon the desired density of the foamed product, i.e., the amount of foaming desired. Generally the concentration of SBH is low, ranging from 0.01 to 5.0, preferably 0.1 to 3.0, most preferably 0.1 to 0.3 percent by weight of the polymer to be foamed. Too little SBH and/or insufficient activator will produce insufficient foaming, while excess SBH will cause collapse of the cells in the foamed structure.

The amount of activator should be sufficient to react with the SBH and thereby cause at least some foaming of the polymer. In determining the relative amounts of activator and SBH in the blowing agent, the activator is advantageously available in at least stoichiometric amounts based upon the proton donor content of the activator component(s). Using mannitol as an example, the stoichiometric molar ratio of the hexahydric alcohol to SBH is 2:3. The ratio can range widely, but is preferably 0.3:1 to 2:1. A slight (e.g., about 20%) excess of activator is preferred.

If boric acid is used, three moles of boric acid are required per mole of mannitol for a stoichiometric reaction, and six moles of water are produced. The water will also serve as a proton donor activator for the SBH, and the ratio of mannitol to SBH can therefore be reduced by one-third, from 2:3 to 4:9. Again a slight excess of the activator is preferred; in a two component activator an excess of mannitol is ordinarily preferred to minimize the amount of produced water.

The SBH and the activator should be separated from direct contact with each other until gas production is desired. Separation of these components can be accomplished by known means. For example, the individual components can each be fed to the machine by separate hoppers or feed systems so that they contact each other only inside the extruder barrel. Encapsulation of at least the SBH in a carrier resin is preferred. As the polyhydric alcohols are crystalline compounds, they can be either encapsulated or dry-blended with a polyolefin or other resin. The separated components can then be premixed to form the foaming agent.

The carrier or blending resin may be polystyrene, polyethylene, polypropylene or any other resin that is compatible with the processing conditions of the polymer to be foamed and that does not adversely affect the desired characteristics of the foamed article. Ideally this resin is the same material as the polymer to be foamed.

Method of Foaming Resin

The following will illustrate the method of making a foam injection-molded article. The foaming agent described above is dispersed into a polymer to be foamed to form a mixture. The mixture is heated in the extruder barrel whereupon the reactive components evolve gas. The mixture is subsequently injected into a mold where the foamed polymer expands into a molded foam article.

The foaming agent of this invention can be used in almost any thermoplastic resin. Among the more commonly foamed resins are ethylene and propylene homopolymers and copolymers, polystyrene, acrylonitrile-butadiene-styrene (ABS), poly(phenylene oxide) (PPO), and poly(phenylene ether) (PPE).

The amount of foaming agent relative to the polymer to be foamed is preferably large enough to be easily and precisely measured, but small enough so that the agent (and particularly the carrier resin) will constitute a small percentage of the polymer. The exact amount is open to choice, but generally about 0.2-3.0 parts by weight of an agent (consisting of encapsulated SBH and the encapsulated activator) are present per 100 parts by weight of the resin to be foamed. About 2 parts per hundred are preferred.

EXAMPLE

This example illustrates the use of boric acid and annitol as an activator for SBH. Sodium borohydride concentrate FM1776H was obtained from Quantum Chemical Corporation, USI Division. This pellet form concentrate was prepared by melt compounding with polystyrene and comprises 10 percent by weight SBH.

The activator was prepared in two parts by dry blending of the components with polyethylene. The first part consisted of 68.25 g of mannitol dry blended with 68.25 g of PETROTHENE NA210 low density polyethylene (LDPE) fines from Quantum Chemical Corporation. The second part consisted of 46.5 g of boric acid dry blended with 46.5 g of NA210 LDPE.

A foaming agent was then prepared by mixing 71.25 g of the SBH concentrate, 136.50 g of the mannitol/LDPE blend, and 93.00 g of the boric acid/LDPE blend. From this total 300.75 g composition, 137 g was blended with 2133 g of polystyrene (Huntsman high impact polystyrene PS 331), resulting in a blend of 6 wt % foaming agent in polystyrene. The blend was then injection molded into tensile specimens at 400° F.

The molded samples exhibited 41.9% density reduction from a control sample of polystyrene with no foaming agent, 0.61 versus 1.05 g/cc. No pitting or chalking was noticed after several weeks storage at ambient conditions.

We claim:

1. A foamable polymeric composition comprising:
   a polymer selected from the group consisting of ethylene and propylene homopolymers and copolymers, polystyrene, acylonitrile-butadiene-styrene, poly(phenylene oxide), and poly(phenylene ether);
   sodium borohydride in an amount from 0.01 to 5.0 weight percent of the polymer; and
   an amount of a polyhydric alcohol sufficient to react with the sodium borohydride, the alcohol being selected from the group consisting of erythritol, pentaerythritol, arabitol, xylitol, adonitol, mannitol, dulcitol, and sorbitol, and the sodium borohydride and the alcohol being isolated from direct contact with each other until gas production is desired.

2. The composition of claim 1 in which the polyhydric alcohol is selected from the group consisting of erythritol, mannitol, dulcitol, and sorbitol.

3. The composition of claim 2 in which the alcohol is mannitol.

4. The composition of claim 3 containing from 0.3 to 2.0 moles mannitol per mole of sodium borohydride.

5. The composition of claim 1 in which the sodium borohydride comprises from 0.1 to 0.3 weight percent of the polymer.

6. The composition of claim 1 in which the sodium borohydride is encapsulated in a carrier resin prior to contacting the polymer to be foamed.

7. The composition of claim 6 in which the carrier resin is selected from the group consisting of polystyrene, polyethylene, and polypropylene.

8. The composition of claim 1 further comprising boric acid.

9. The composition of claim 8 in which the alcohol is mannitol.

* * * * *